United States Patent
Liu

(10) Patent No.: US 9,188,712 B2
(45) Date of Patent: Nov. 17, 2015

(54) TRANSPARENT ILLUMINATION PANEL AND METHOD OF MANUFACTURING

(75) Inventor: Xinbing Liu, Acton, MA (US)

(73) Assignee: PANASONIC CORPORATION, Osaka (JP)

(*) Notice: Subject to any disclaimer, the term of this patent is extended or adjusted under 35 U.S.C. 154(b) by 596 days.

(21) Appl. No.: 13/566,399

(22) Filed: Aug. 3, 2012

(65) Prior Publication Data

US 2014/0036370 A1 Feb. 6, 2014

(51) Int. Cl.
*G02B 5/02* (2006.01)
*B29C 39/10* (2006.01)
*B29D 11/00* (2006.01)
*G02B 27/28* (2006.01)
*F21V 8/00* (2006.01)

(52) U.S. Cl.
CPC ............... *G02B 5/0236* (2013.01); *B29C 39/10* (2013.01); *B29D 11/00798* (2013.01); *G02B 5/0263* (2013.01); *G02B 27/285* (2013.01); *G02B 6/0056* (2013.01)

(58) Field of Classification Search
None
See application file for complete search history.

(56) References Cited

U.S. PATENT DOCUMENTS

| 6,434,283 B2* | 8/2002 | Frederick et al. ............... 385/11 |
| 6,870,676 B2* | 3/2005 | Stark ........................ 359/485.03 |
| 2009/0010023 A1* | 1/2009 | Kanade et al. ................ 362/606 |

OTHER PUBLICATIONS

F. L. Pedrotti, L. S. Pedrotti, 'Introduction to Optics', Prentice Hall, New Jersey, 1993, pp. 407-414.*

* cited by examiner

*Primary Examiner* — Arnel C Lavarias
(74) *Attorney, Agent, or Firm* — Greenblum & Bernstein P.L.C.

(57) ABSTRACT

A light diffuser panel for coupling to an optical element, includes a plurality of first type layers of a first type of material with a refractive index $n_1$, and a plurality of second type layers of a second type of material with a different refractive index $n_2$, wherein each of the first type layers and each of the second type layers are arranged to form a plurality of interface surfaces between alternating first type layers and second type layers, tilted at a plurality of angles with tilt axes that are parallel to a plane of the light diffuser panel, such that visible light from the optical element is transmitted through the light diffuser panel and the interface surfaces, and a portion of the visible light from the optical element is reflected out of the light diffuser panel at each of the interface surfaces.

11 Claims, 2 Drawing Sheets

TRANSPARENT ILLUMINATION PANEL AND METHOD OF MANUFACTURING

BACKGROUND

1. Field of the Disclosure

The present invention generally relates to light diffusers for illuminating environments or objects and methods of manufacturing light diffusers.

2. Background Information

Light sources used for illumination typically require diffusers to diffuse or to spread out or to scatter the light to produce soft light, which generally cast shadows with no edges or soft edges as opposed to sharp edges. For example, in photography, soft light is used to reduce visibility of wrinkles for people to achieve a more youthful look.

Typical diffusers are hazy in appearance, or the diffusers are opaque or non-transparent. That is, an observer cannot see objects clearly through a typical diffuser. Typical diffusers may include for example, ground glass diffusers, TEFLON® (polytetrafluoroethylene or PTFE) diffusers, holographic diffusers, opal glass diffusers, and greyed glass diffusers. Because such diffusers are not transparent, their presence in the view of observers may seem distracting and unpleasant.

Therefore, a transparent diffuser that can provide higher efficiency of lighting and a more pleasant transparent view may be beneficial and is needed.

SUMMARY OF THE DISCLOSURE

The present disclosure, through one or more of its various aspects, embodiments, and/or specific features or sub-components, provides various device, apparatus, or structures that can achieve the transparent diffuser, as well as method that can be used to manufacture the transparent diffuser.

In one aspect of the invention, a light diffuser panel for coupling to an optical element, includes a plurality of first type layers of a first type of material with a refractive index $n_1$, and a plurality of second type layers of a second type of material with a different refractive index $n_2$, wherein each of the first type layers and each of the second type layers are arranged to form a plurality of interface surfaces between alternating first type layers and second type layers, tilted at a plurality of angles with tilt axes that are parallel to a plane of the light diffuser panel, such that visible light from the optical element is transmitted through the light diffuser panel and the interface surfaces, and a portion of the visible light from the optical element is reflected out of the light diffuser panel at each of the interface surfaces.

According to another feature of the invention, each of the plurality of the first type layers and each of the plurality of the second type layers have a thickness that is greater than a largest wavelength of the visible light.

According to another feature of the invention, each of the plurality of the angles is 45°.

According to another feature of the invention, a total reflectance of each of the plurality of the interface surfaces is less than 2%.

According to another feature of the invention, the first type layers comprise a polycarbonate material, and the second type layers comprise an acrylic material.

According to another feature of the invention, at least one edge portion of the light diffuser panel comprises one of the plurality of the second type layers and is configured to receive the visible light from the optical element.

According to another feature of the invention, the light diffuser panel further includes a polarization rotator plate configured to rotate light polarization of the visible light that has transmitted through at least one of the plurality of the interface surfaces.

According to another feature of the invention, the optical element comprises at least one of a LED, a laser diode, a fluorescent light source, an optical waveguide, an optical reflector, an optical refractor, and a polarizer.

According to another feature of the invention, the plurality of the first type layers are arranged at a plurality of predetermined positions with a plurality of predetermined interval distances between central planes of adjacent first type layers, each of the plurality of the predetermined interval distances is T times an adjacent predetermined interval distance that is closer to the optical element, each of the plurality of the predetermined interval distances is 1/T times an adjacent predetermined interval distance that is further from the optical element, where T is a total transmittance of each of the plurality of the interface surfaces, T is equal to 1−R, and R is a total reflectance of each of the plurality of the interface surfaces.

According to another aspect of the invention relates to a manufacturing process or method for manufacturing a light diffuser panel that is capable of diffusing visible light from an optical element, the method includes arranging a plurality of first type layers comprising a first type of material with a refractive index $n_1$, in a mold, at a plurality of predetermined positions with a plurality of predetermined horizontal interval distances between central planes of adjacent first type layers, and with the plurality of the first type layers tilted at a plurality of angles respectively with a plurality of tilt axes that are parallel to a horizontal plane, injecting a liquid form of a second type of material into the mold, to fill space between the plurality of the first type layers, curing or hardening the liquid form of a second type of material into a solid block in the mold, to form a plurality of second type layers with a refractive index $n_2$, such that each of the plurality of the first type layers is between two second type layers, to form a plurality of interface surfaces between alternating ones of the first type layers and the second type layers, cutting the solid block horizontally into a plurality of plates, polishing surfaces of the plates, and polishing at least one of the edges of the plates.

BRIEF DESCRIPTION OF THE DRAWINGS

The present invention is further described in the detailed description which follows, in reference to the noted plurality of drawings, by way of non-limiting examples of preferred embodiments of the present invention, in which like characters represent like elements throughout the several views of the drawings.

DETAILED DESCRIPTION

The present disclosure, through one or more of its various aspects, embodiments and/or specific features or sub-components, is thus intended to bring about one or more of the advantages as specifically noted below.

Figure 1:
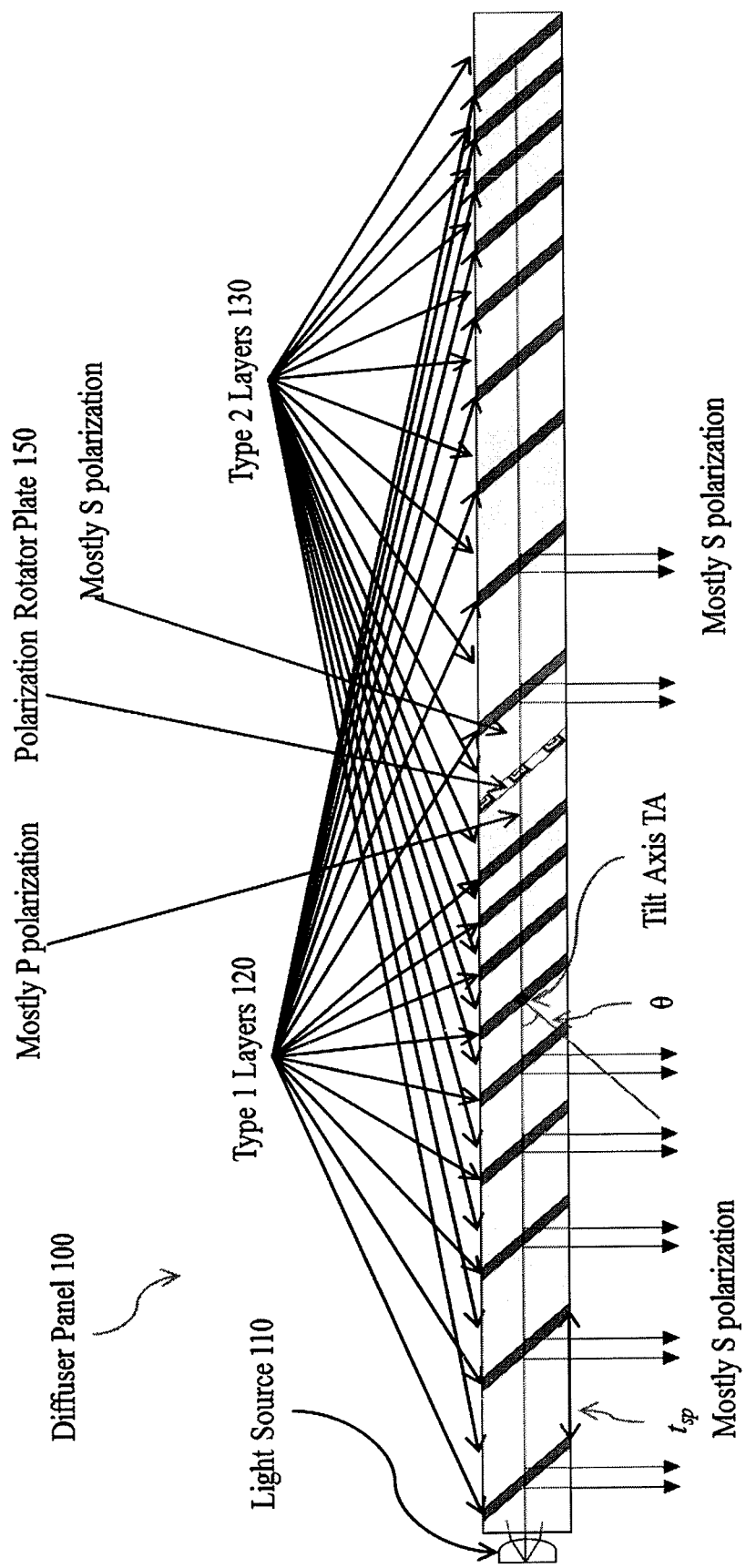
FIG. 1 illustrates a cross sectional view of an exemplary diffuser panel in accordance with the embodiment described herein.

FIG. 1 illustrates a cross sectional view of an exemplary diffuser panel in accordance with the embodiment described herein. The diffuser panel 100 is generally shown in the cross sectional view. The diffuser panel 100 comprises a plurality of Type 1 layers 120 of a specific refractive index $n_1$ arranged alternately with a plurality of Type 2 layers 130 of a specific refractive index $n_2$.

Each Type 1 layer 120 has a predetermined thickness (not shown) which may be greater than the wavelength of visible light. Each Type 2 layer 130 has a predetermined thickness which may be greater than the wavelength of visible light. If any of the Type 1 layers 120 or the Type 2 layers has a thickness that is less than the wavelength of visible light, visible light passing through the layers may be subject to diffractive effects. This may cause the layers to become visible.

The thickness $t_{sp}$ of each Type 2 layer 130 may be variable, to allow variable spacing between Type 1 layers 120. One edge (left edge) of the diffuser panel 100 may be configured to receive light from a light source 110. Each Type 1 layer 120 is arranged so that a central plane of each Type 1 layer 120 has a spacing distance $t_{sp}$ from the central plane of the adjacent Type 1 layer 120, along the direction of the light transmission. Furthermore, each Type 1 layer 120 is arranged, with the normal of the surface of the Type 1 layer 120 at an angle $\theta$, relative to a general direction parallel to the plane of the diffuser panel 100. In other words, the Type 1 layers 120 are tilted at an angle $\theta$ with a tilt axis TA. The tilt axis TA is parallel to the plane of the diffuser panel 100 and perpendicular to the direction of light transmission from a light source 110 on one edge of the diffuser panel 100. The angle $\theta$ would also be an incident angle of the light relative to the normal of the interface surface between each adjacent pair of Type 1 layers 120 and Type 2 layers 130.

Visible light from the light source 110 transmits, or is reflected by total internal reflection, generally parallel to the plane of the diffuser panel. The visible light would generally contain light with different polarizations. Polarization directions of light are perpendicular to the direction of light transmission. In the exemplary diffuser panel 100 of FIG. 1, the visible light contains light with S-polarization, which is light polarized in the direction that is parallel to the plane of the diffuser panel, and light with P-polarization, which is light polarized in the direction that is perpendicular to the plane of the diffuser panel.

In the exemplary diffuser panel 100, at each interface surface between each adjacent pair of Type 1 layers 120 and Type 2 layers 130, light with S-polarization would generally be reflected in greater relative reflectance than light with P-polarization.

The relative reflectance of light with S-polarization for each interface surface ($R_s$) and the relative reflectance of light with P-polarization for each interface surface ($R_p$) are defined below in equations (1) and (2), respectively.

$$R_s = \left[ \frac{n_1 * \cos\theta - n_2 * \sqrt{1 - \left(\frac{n_1}{n_2}\sin\theta\right)^2}}{n_1 * \cos\theta + n_2 * \sqrt{1 - \left(\frac{n_1}{n_2}\sin\theta\right)^2}} \right]^2 \quad (1)$$

$$R_p = \left[ \frac{n_1 * \sqrt{1 - \left(\frac{n_1}{n_2}\sin\theta\right)^2} - n_2 * \cos\theta}{n_1 * \sqrt{1 - \left(\frac{n_1}{n_2}\sin\theta\right)^2} + n_2 * \cos\theta} \right]^2 \quad (2)$$

Preferably, the angle $\theta$ should be 45 degrees. Preferably, the difference between refractive index $n_1$ and refractive index $n_2$ should be small enough to enable the interface surface between each adjacent pair of Type 1 layers 120 and Type 2 layers 130 to be not visually detectable by human vision.

In the above equations (1) and (2), if the combined reflectance of $R_s$ and $R_p$ at each interface surface is less than 2%, then generally the interface surfaces between the layers would not be visually detectable. Preferably, the combined reflectance of $R_s$ and $R_p$ at each interface surface is less than 1%.

As an non-limiting example, if angle $\theta$ is 45 degrees, Type 1 layer 120 is polycarbonate with a refractive index $n_1$ of 1.5896 for a light at a wavelength of 0.55 um, and Type 2 layer 130 is acrylic with a refractive index $n_2$ of 1.4936 for a light at a wavelength of 0.55 um, solving equations (1) and (2) would obtain $R_s$=0.35%, and $R_p$=0.0012%, for reflectance of light that would transmit perpendicular to the plane of the diffuser panel. (Which would give combined reflectance that is less than 2%, and thus each interface surfaces would not be visually detectable.)

In the above example, $R_s$ is much greater than $R_p$. The combined reflectance is still relatively small for each interface surface. To increase the reflectance of light, a plurality of interface surfaces may be used, for example as illustrated in FIG. 1.

T is defined as the relative transmittance at each interface surface. The remaining amount of light, or cumulative transmittance, after N reflections is $T^N$, and where defined separately for $R_s$ and $R_p$, and R equals one of $R_s$ and $R_p$, $T^N$ is defined in equation (3) below.

$$T^N = (1-R)^N \quad (3)$$

The cumulative reflectance S from N reflections, as a fraction of the amount of the input light, where defined separately for $R_s$ and $R_p$, and R equals one of $R_s$ and $R_p$, is defined in equation (4) below.

$$S = 1 - T^N = 1 - (1-R)^N \quad (4)$$

To determine the number of reflections required, or the number of interface surfaces required, N can be determined generally in equation (5) below.

$$N = \frac{\ln(1-S)}{\ln(1-R)} \quad (5)$$

Thus, in the case above, if the light is S-polarized, after 100 reflections (50 polycarbonate sheets), $1-(1-R_s)^{100}$=30% of the light is reflected. After 500 reflections (250 polycarbonate sheets), 82% of the light is reflected.

If the light is P-polarized, after 100 reflections (50 polycarbonate sheets), 0.12% of the light is reflected. After 1000 reflections (500 polycarbonate sheets) 1.2% of the light is reflected. After 10000 reflections (5000 polycarbonate sheets), 11.2% of the light is reflected. P-polarization reflectance is relatively low, compared to the S-polarization reflectance above.

Thus, for typical light with both S-polarization and P-polarization, the S-polarized light portion will be reflected in greater relative amount than the P-polarized light portion.

The exemplary diffuser panel 100 of FIG. 1 may include two half portions, with a polarization rotator plate 150 to rotate the polarization of the light. In this non-limiting exemplary arrangement, the left half portion (or the first half portion) of the diffuser panel contains sufficient number of interface surfaces to reflect a majority of the S-polarized light portion of the light from the light source 110, while allowing most of the P-polarized light portion of the light from the light source 110 to transmit through.

When the mostly P-polarized light portion of the light from the light source 110 passes through the polarization rotator plate 150, the mostly P-polarized light portion of the light is rotated in polarization by 90 degrees to turn or be converted into mostly S-polarized light, which is then transmitted to the right half (the second half) of the diffuser panel, causing the mostly S-polarized light to reflect through the series of interface surfaces in the right half (the second half) of the diffuser panel.

While the values of $R_s$ and $R_p$ are the same at each interface surface in the above non-limiting exemplary case, the amount of light reflected is different, because the values of $R_s$ and $R_p$ are relative reflectance values, and the light reflected would be dependent upon amount of light incident, which decreases after transmitting through each interface surface.

In a preferred configuration, to obtain the cumulative reflectance S>90% from N interface surfaces for S-polarized light in the case above, using the equations above, N is determined to be greater than 656 (or 328 pairs of acrylic and polycarbonate layers). In this configuration, the cumulative reflectance of P-polarized light through 656 interface surfaces is only approximately 0.78%, meaning approximately 99.22% of P-polarized light would transmit through the 656 interface surfaces.

As a portion of the light is reflected at each interface surface, the transmitted light is diminished as it crosses multiple interface surfaces. Thus, at each successive interface surfaces along the path of the light transmission, amount of light reflected also diminishes.

In an exemplary configuration, in order to provide more even density of illuminated light, the spacing between the Type 1 layers can be decreased to even out amount of light reflected along the direction of light transmission.

The amount of light reflected at an interface surface is R (for one of $R_s$ and $R_p$), then the amount of light reflected at the next adjacent interface surface downstream along the light path in the diffuser panel is T*R. The ratio of reflected light amount between two adjacent interface surfaces is T*R:R=T, the ratio of two adjacent spacing distances can also be set to T. That is, if $1^{st}$ spacing distance is $t_{sp1}$, then the $2^{nd}$ spacing distance $t_{sp2}=T*t_{sp1}$, and the $3^{rd}$ spacing distance $t_{sp3}=T^2*t_{sp1}$, ..., so on. Conversely, $t_{sp1}=t_{sp3}*T^2$.

Total length of one half portion is $t_{total}$, as relative to the minimal spacing distance $t_{min}$, and can be determined generally from equations (6), (7), and (8) below.

$$t_{total} = t_{min} * \left( \frac{1}{T} + \frac{1}{T^2} + \dots + \frac{1}{T^{N-1}} \right) \quad (6)$$

$$= t_{min} * \frac{T^{-N+1} - 1}{1 - T}$$

$$t_{min} = t_{total} * \frac{1 - T}{T^{-N+1} - 1} \quad (7)$$

$$t_{max} = t_{min} * \frac{1}{T^{N-1}} \quad (8)$$

For the non-limiting example above, where there are N=656 interface surfaces, if $t_{total}$=250 mm for a half portion, and T (for S-polarized light)=99.65%, then $t_{min}$=0.098 mm, and $t_{max}$=0.97 mm.

Preferably, the minimal spacing distance $t_{min}$ should be greater than the thickness of each Type 1 layer 120. Preferably, the minimal spacing distance $t_{min}$ should be greater than twice the thickness of each Type 1 layer 120.

The diffuser panel 100 may be integrated with a light source 110 on one edge of the diffuser panel 100. The light source 110 may be for example, light source such as LED, laser diode and SLD (super luminescent diode), or coupling optics such as collection lens, collimator, and beam shaper, etc. which transmit light generated from a source of light. The light source 110 may be mounted or bonded on the one edge of the diffuser panel 100, for example by mechanical mounting structures, chemical adhesives, heating, or a combination of such mounting methods. The light source 110 may be for example, designed to direct light of one or more visible wavelengths into the diffuser panel 100 from the one edge, at one or more oblique angles relative to the plane of the diffuser panel 100.

In this configuration, the light transmitted by the light source 110 into the diffuser panel 100 will be transmitted through the plurality of interface surfaces between the Type 1 layers and Type 2 layers, and diffused from generally the entire surface of diffuser panel 100, as noted above, to illuminate objects on one side of the diffuser panel. Because the difference between the refractive indexes of the different materials is small, the interface surfaces between the alternating layers of materials would not be visually detectable. Thus, the illuminated objects would be clearly visible when viewed through the panel. Additionally, the illumination is directed toward one side of the diffuser panel. Objects under the illumination can be viewed through the diffuser panel with relative high contrast. This provides a transparent diffuser that can provide higher efficiency of lighting and a more pleasant transparent view.

In another possible configuration, two light sources may be implemented on the opposite edges of the diffuser panel 100, to allow two oppositely directed light to be passed through the series of interface surfaces. The result would be illumination on both sides of the diffuser panel.

Figure 2:
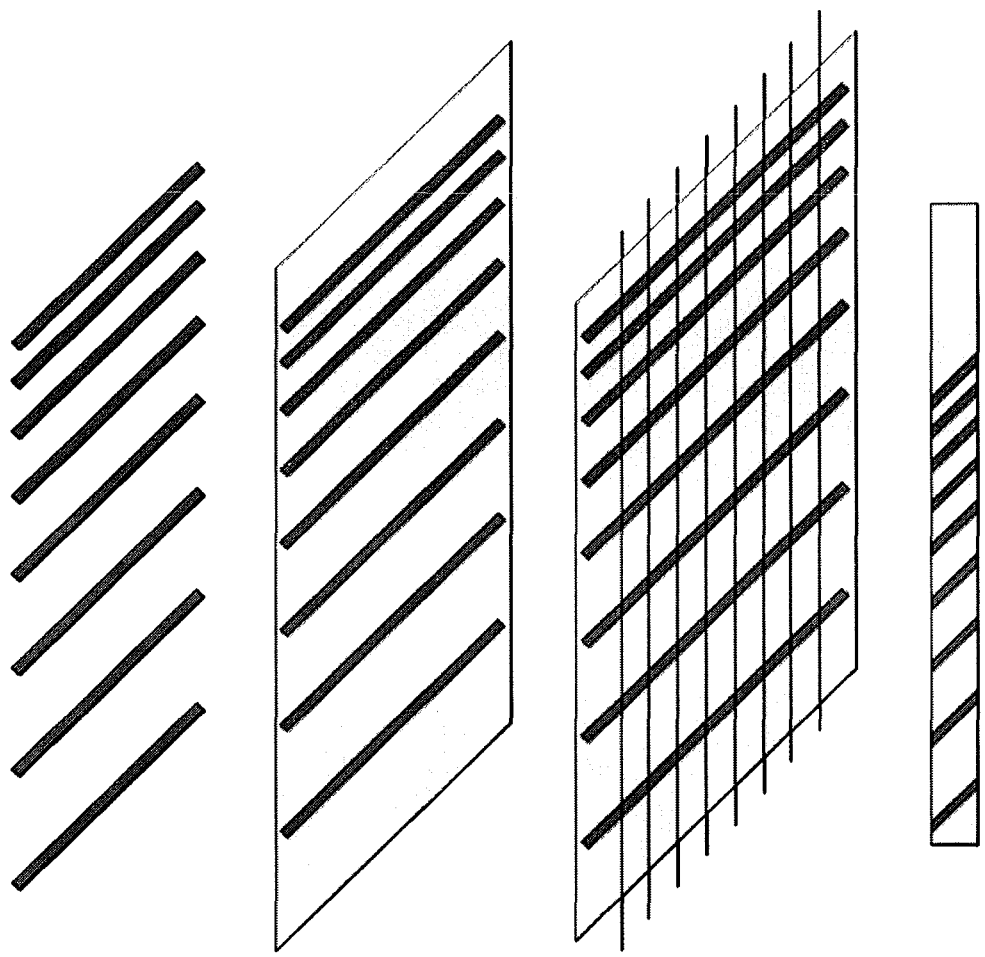
FIG. 2 illustrates an exemplary manufacturing process flow for manufacturing the diffuser panels in accordance with the embodiment described herein.
Figure 2:
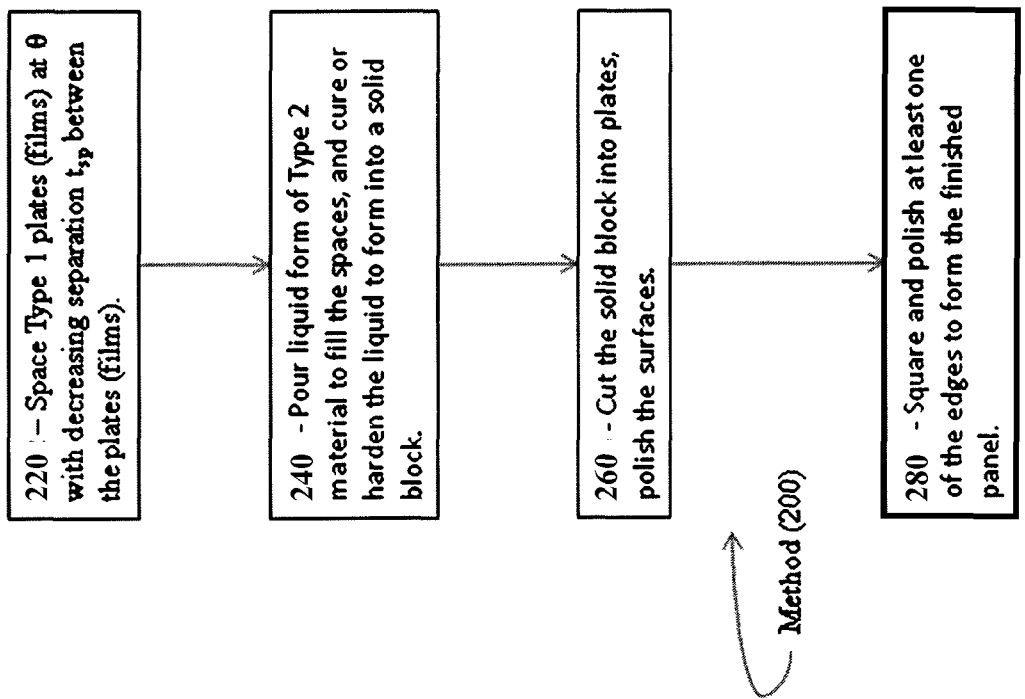

FIG. 2 illustrates an exemplary manufacturing process flow for manufacturing the diffuser panels in accordance with the embodiment described herein. The manufacturing process 200 starts at step 220, where a plurality of Type 1 layers are spaced in a mold or a cavity, at angle θ relative to the horizontal plane, with a plurality of spacing distances $t_{sp}$ between adjacent Type 1 layers.

At step 240, liquid form of Type 2 layer is poured in the mold or the cavity to fill the spaces, while the Type 1 layers are held in place, and then the liquid is cured or hardened to form into a solid block.

At step 260, the block is cut into plates, and the surfaces are polished.

At step 280, at least one of the edges is squared and polished to allow light to be received, thus forming the finished panel.

Optionally, a polarization rotator plate may be placed in the mold or the cavity in step 220, and spaced from the Type 1 layers, to create the configuration shown in FIG. 1. The polarization rotator plate does not have to be tilted.

Alternatively, two half portions may be formed first from the manufacturing method 200, and then joined or bonded together with a polarization rotator plate in between the two half portions.

Some additional cutting, polishing, cleaning, baking, annealing, setting, and/or laminating steps may be performed on the diffuser panel to finalize its form and adjust its functions. Additionally, light sources may be mounted on the diffuser panel as an integrating process step.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiment, the invention is not intended to be limited to the particulars disclosed; rather the invention extends to all functionally equivalent structures, methods, and uses such as are within the scope of the appended claims.

Although the present specification describes components and functions that may be implemented in particular embodiment with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiment described herein are intended to provide a general understanding of the various embodiment. The illustrations are not intended to serve as a complete description of all of the elements and features of apparatus and systems that utilize the structures or methods described herein. In this regard, no attempt is made to show structural details of the present invention in more detail than is necessary for the fundamental understanding of the present invention. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A light diffuser panel for coupling to an optical element, comprising:
    a plurality of first type layers comprising a first type of material with a refractive index $n_1$; and
    a plurality of second type layers comprising a second type of material with a refractive index $n_2$ different from the refractive index $n_1$; and
    a polarization rotator plate;
    wherein each of the plurality of the first type layers and each of the plurality of the second type layers are arranged, such that each of the plurality of the first type layers is between two second type layers, to form a plurality of interface surfaces between alternating ones of the first type layers and the second type layers,
    the plurality of the interface surfaces are tilted at a plurality of angles respectively with a plurality of tilt axes that are parallel to a plane of the light diffuser panel,
    wherein visible light from the optical element is transmitted through the light diffuser panel and each of the plurality of the interface surfaces, and portions of the visible light from the optical element are reflected out of the light diffuser panel at each of the plurality of the interface surfaces and
    wherein the polarization rotator plate is configured to rotate light polarization of the visible light that has transmitted through at least one of the plurality of the interface surfaces.

2. The light diffuser panel according to claim 1, wherein $\theta$ is one of the plurality of angles at one of the interface surfaces,
    a relative reflectance of S-polarized light at the one of the interface surfaces is $R_s$,
    a relative reflectance of P-polarized light at the one of the interface surfaces is $R_p$, and
    $R_s$ and $R_p$ are respectively $$R_s = \left[ \frac{n_1 * \cos\theta - n_2 * \sqrt{1 - \left(\frac{n_1}{n_2}\sin\theta\right)^2}}{n_1 * \cos\theta + n_2 * \sqrt{1 - \left(\frac{n_1}{n_2}\sin\theta\right)^2}} \right]^2$$

$$R_p = \left[ \frac{n_1 * \sqrt{1 - \left(\frac{n_1}{n_2}\sin\theta\right)^2} - n_2 * \cos\theta}{n_1 * \sqrt{1 - \left(\frac{n_1}{n_2}\sin\theta\right)^2} + n_2 * \cos\theta} \right]^2.$$

3. The light diffuser panel according to claim 1, wherein each of the plurality of the first type layers and each of the plurality of the second type layers have a thickness that is greater than a largest wavelength of the visible light.

4. The light diffuser panel according to claim 1, wherein each of the plurality of the angles is 45°.

5. The light diffuser panel according to claim 1, wherein a total reflectance of each of the plurality of the interface surfaces is less than 2%.

6. The light diffuser panel according to claim 1, wherein the first type layers comprise a polycarbonate material, and the second type layers comprise an acrylic material.

7. The light diffuser panel according to claim 1, wherein at least one edge portion of the light diffuser panel comprises one of the plurality of the second type layers and is configured to receive the visible light from the optical element.

8. The light diffuser panel according to claim 1, wherein the optical element comprises at least one of a light emitting diode (LED), a laser diode, a fluorescent light source, an optical waveguide, an optical reflector, an optical refractor, and a polarizer.

9. The light diffuser panel according to claim 1, wherein the portions of the visible light from the optical element are reflected out of one side of the light diffuser panel.

10. A light diffuser panel for coupling to an optical element,
comprising:
a plurality of first type layers comprising a first type of material with a refractive index $n_1$; and
a plurality of second type layers comprising a second type of material with a refractive index $n_2$ different from the refractive index $n_1$;
wherein each of the plurality of the first type layers and each of the plurality of the second type layers are arranged, such that each of the plurality of the first type layers is between two second type layers, to form a plurality of interface surfaces between alternating ones of the first type layers and the second type layers, the plurality of the interface surfaces are tilted at a plurality of angles respectively with a plurality of tilt axes that are parallel to a plane of the light diffuser panel,
wherein visible light from the optical element is transmitted through the light diffuser panel and each of the plurality of the interface surfaces, and portions of the visible light from the optical element are reflected out of the light diffuser panel at each of the plurality of the interface surfaces;
wherein the plurality of the first type layers are arranged at a plurality of predetermined positions with a plurality of predetermined interval distances between central planes of adjacent first type layers,
each of the plurality of the predetermined interval distances is T times an adjacent predetermined interval distance that is closer to the optical element,
each of the plurality of the predetermined interval distances is 1/T times an adjacent predetermined interval distance that is further from the optical element, where
T is a relative transmittance of each of the plurality of the interface surfaces,
T is equal to 1−R, and
R is a relative reflectance of each of the plurality of the interface surfaces.

11. The light diffuser panel according to claim 10, wherein each of the plurality of the first type layers and each of the plurality of the second type layers have a thickness that is greater than a largest wavelength of the visible light.

* * * * *